US009163606B2

(12) United States Patent
Azar

(10) Patent No.: US 9,163,606 B2
(45) Date of Patent: Oct. 20, 2015

(54) HYDRO-ELECTRIC TUBE GENERATION

(76) Inventor: Chris Essa Azar, Monroe, NC (US)

( * ) Notice: Subject to any disclaimer, the term of this patent is extended or adjusted under 35 U.S.C. 154(b) by 510 days.

(21) Appl. No.: 13/615,387

(22) Filed: Sep. 13, 2012

(65) Prior Publication Data
US 2013/0089410 A1 Apr. 11, 2013

Related U.S. Application Data

(60) Provisional application No. 61/544,826, filed on Oct. 7, 2011.

(51) Int. Cl.
F03B 13/10 (2006.01)
F03B 13/06 (2006.01)
F03B 7/00 (2006.01)
F03B 17/06 (2006.01)
F03B 17/02 (2006.01)
F03B 17/04 (2006.01)

(52) U.S. Cl.
CPC ............... *F03B 13/06* (2013.01); *F03B 7/003* (2013.01); *F03B 17/02* (2013.01); *F03B 17/04* (2013.01); *F03B 17/062* (2013.01); *F05B 2260/42* (2013.01); *Y02E 10/20* (2013.01); *Y02E 10/22* (2013.01); *Y02E 60/17* (2013.01)

(58) Field of Classification Search
CPC ........ F03B 7/003; F03B 13/06; F03B 17/062; F03B 17/04; F05B 2250/712; F05B 2260/42
USPC .................... 415/202; 416/197 A; 290/43, 54
See application file for complete search history.

(56) References Cited

U.S. PATENT DOCUMENTS

| 1,742,068 | A | * | 12/1929 | Grasset | 405/77 |
| 8,030,790 | B2 | * | 10/2011 | Kamenov | 290/43 |
| 2009/0058092 | A1 | * | 3/2009 | Chen | 290/54 |
| 2009/0115189 | A1 | * | 5/2009 | Lin | 290/43 |

* cited by examiner

*Primary Examiner* — Ninh H Nguyen
(74) *Attorney, Agent, or Firm* — BN IP-Consulting LLC; Binh-An Nguyen

(57) ABSTRACT

Disclosed is a hydro-electric energy system comprised of an inner and outer tube designed to contain and distribute water such that failing water powers hydro-electric turbines located in the inner tube. The system may be located in a body of water taking in and distributing the surrounding water, or on and utilizes natural or/constructed/water sources. A number of different pump types are utilized at the bottom of the inner tube to maintain water levels and water flow within the system. In certain embodiments the pumps are driven by pressure and gravitational forces. In other embodiments supplemental power sources drive the pumps either power generated from the system's turbines or power sources external to the system.

16 Claims, 6 Drawing Sheets

Figure 4

Approximate Water Pressure At Depth (estimates in salt water)

| DEPTH (feet) | PSI (pressure per square inch) |
|---|---|
| 10 | 19.1396 |
| 50 | 36.9142 |
| 100 | 59.1325 |
| 250 | 125.787 |
| 500 | 236.879 |
| 1000 | 459.062 |
| 1500 | 681.245 |

HYDRO-ELECTRIC TUBE GENERATION

CROSS-REFERENCE TO RELATED APPLICATIONS

This application claims the benefit of provisional application 61/544,826 filed Oct. 7, 2011.

STATEMENT REGUARDING FEDERALLY SPONSORED RESEARCH OR DEVELOPMENT

None

BACKGROUND OF THE INVENTION

Hydroelectric energy often utilizes rivers, natural waterfalls or man made darns to produce energy. However natural waterfalls suitable for energy production are rare. Man made darns are expensive to build and require flooding large areas of and behind the dam. Traditional energy sources such as fossil fuels have numerous drawbacks and in recent years the desire for renewable energy sources has grown.

The present invention provides for a clean and renewable energy source. Once in place the system produces enough energy to be used as an energy source as well as maintain and operate itself.

SUMMARY OF THE INVENTION

This process provides for the free flow of water from the ocean surface or on land as long as there is adequate water flow. This will generate a surplus of energy/electricity and overcome all obstacles of using the same energy to make the process viable and work. This process is designed to have the inner tube air atmospheric pressure. It will withstand ocean pressures that surround it from the outer tube and will produce natural hydro-electric energy as the end result.

The hydro-electric tube generator as described herein and in the schematics is anchored or suspended and can be utilized in water, floated, sitting on piers, tied to a barge, etc. It can be on land, in a lake, a body of water or land provided there is water volume flow to satisfy the system's process.

BRIEF DESCRIPTION OF THE DRAWINGS & FIGURES

FIG. 4 is a table of water pressure at various depths in salt water.

DETAILED DESCRIPTION OF THE INVENTION

Figure 1:
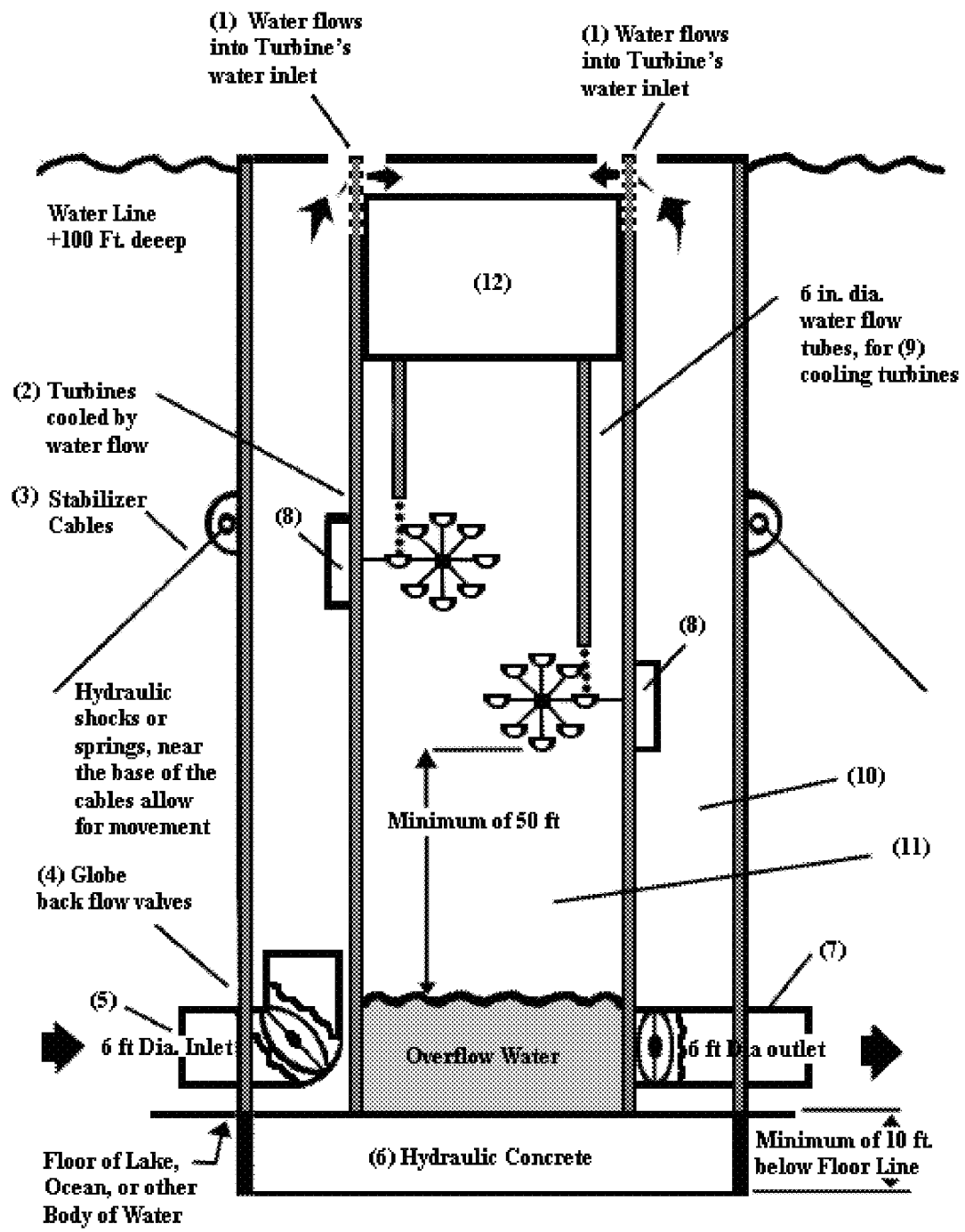
FIG. 1 shows the overall design of one particular embodiment of the hydroelectric system including water inlets, how water moves inward through the outer and inner tubes and past the turbines, the water outlet, and all necessary components for the systems stabilization and function.

In FIG. 1, the water flows from each inlet (5) at the bottom of the outer tube (10) past the turbines (2) in the inner tube (11) and out through the outlet (7) to the water's surface. In some embodiments the end of the outer tube extends above the water surface, but may also be below the surface.

Figure 3:
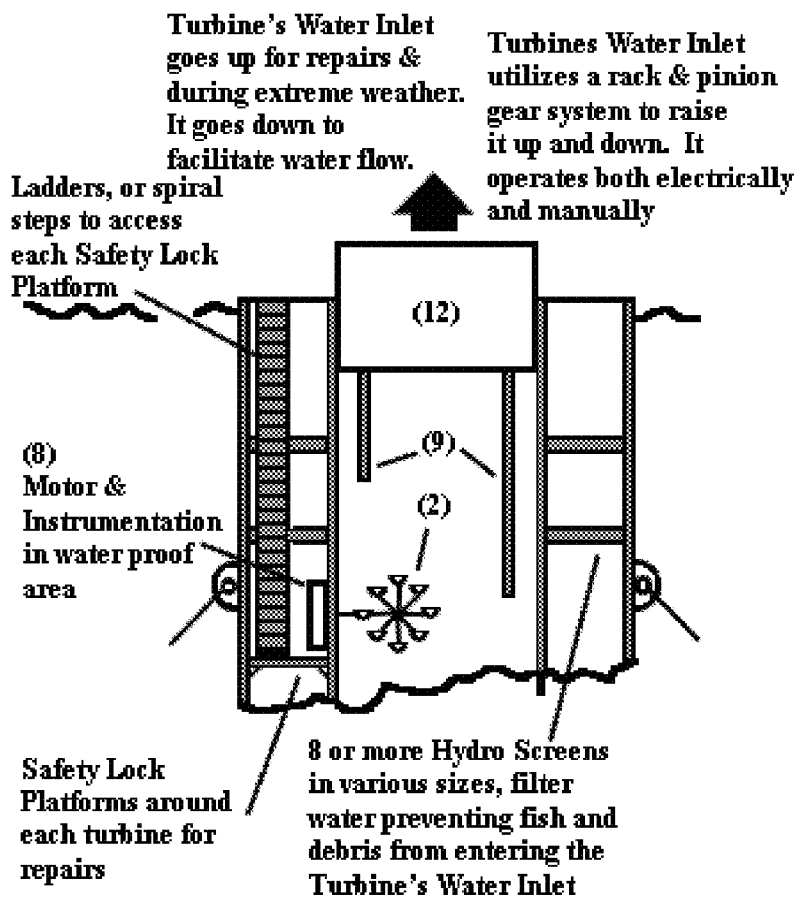
FIG. 3 shows the design of the water net and how water flow into the inner tube is regulated.

The inlet in the outer tube (5) can be regulated to increase or restrict water flow to equal the flow of water out through the outlet (7) in order to maintain the appropriate water level in the overflow area in the bottom of the inner tube. The inner tube has a top plate (12) that is the water inlet which utilizes a rack and pinion gear system to raise it up and down (the up position is shown in FIG. 3). It operates electrically, manually or hydraulically. When it is lowered, it allows the flow into the inner tube as shown in FIG. 1. Once passing through the porous surface or openings (1) in the upper portion of the inner tube water flows inside the surface plate that moves up and down, and into collection surfaces in the shape of water funnels that direct water into funnel tubes (9) that will concentrate the water flow and hit the desired point on the turbine plates (2). The surface plate has 4 symmetrical funnels to 4 attached tubes and extends to different turbines. The goal is to get the maximum amount of energy generated from the distance of the tubes. The distance from the end of the tube (funnel tube, (9)) to the turbine blades is the most desirable head, in preferred embodiments a minimum of 100 feet or longer. The diameter of the funnel tubes and the head will determine the cubic feet of water per second (cfs). The amount of kilowatts (kw) produced is calculated by the following equation:

$$kw = \frac{\text{HEAD(feet)} \times \text{FLOW}(cfs)}{11.81}$$

In the example shown in FIG. 1, the distance between the lowest turbine surface blade to the potential accumulation of water at the end of the inner tube is no less than 50-100 feet with more water storage of about 50% more than the accumulation of incoming water.

The energy created by a turbine in the tube in the current embodiment is:

$$\frac{[100 \text{ ft(head)}] \times [600 \text{ cubic ft/sec(flow)}] \times [80\% \text{ (efficiency)}]}{[11.8 \text{(conversion units)}]} =$$

4,067.79 kilowatts per turbine.

4 turbines thus produces approximately 16,271 kw's. After passing through the turbines the water then drops to the bottom of the inner tube, where it is pumped out or recirculated as described herein.

This process will utilize the gravity drop of water from the turbine to the bottom of the tube. This energy will be recaptured (weight of incoming water×distance travelled×gravity) from the turbine and sent in part to where the pumps are (bottom of tube (7)). The energy is used to empty the excess water that needs to be emptied from the inner tube to the outer tube (on land) or through to the outside of the outer tube to the ambient water or waters surface (when used in a body of water). This is carried out with a self perpetuating pump system plus some small electrical source from the turbines. The amount of water pumped out is the amount needed to keep pace with the incoming surface flow of water, which maintains the system in a viable energy efficient way.

The calculations for the amount of energy/power that will be captured is equal to the amount of volume of water coming through times the depth, "the head". This will give a portion of energy created to move some the water in the bottom of the reservoir. This is less pressure than the water pressure at the bottom of the outer tube (where water is extracted to). The difference in energy needed for the pump may need to come from the turbine themselves, and will vary depending whether the system is used on land or at depth, and whether the water is pumped into the outer tube, into a body of water at depth, or up to the water's surface. A conservative calculation will show the amount of energy needed to pump/extract will be less than 20% of what each generator will produce. Other physics and engineering calculations, and other methods to remove some of the water at the bottom of the tube will be known to those skilled in the art.

The surface plate (12) can be raised or lowered to stop the flow of water into the inner tube (see FIG. 3). In the embodiment of FIG. 1, the plate moves up to 20 feet up and down. For example during storms, hurricanes, or other undesirable conditions the surface plate is raised above the water level to protect the turbines and the overall structure and prevent the flow of water into the inner tubes. It can also be moved up and down in order to control the exact amount of water flow into the inner tube. The movement of the surface plate may be powered by numerous sources, such as excess energy from the turbines, a valve capturing wind energy from the surface located on top of the inner or outer tube, or a solar cell at the surface of the structure.

Figure 2:
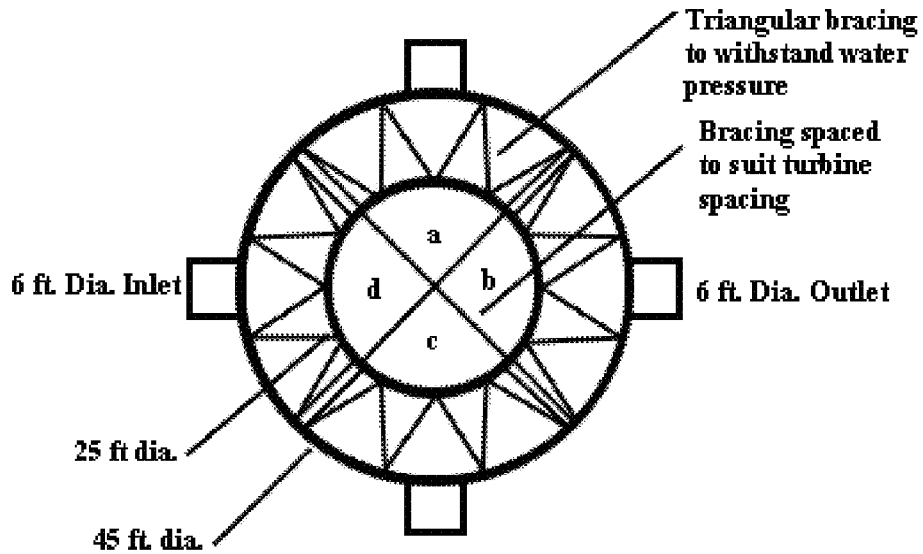
FIG. 2 shows a top view of the systems basic design. Triangular bracing is used to withstand outside pressure.
Figure 5:
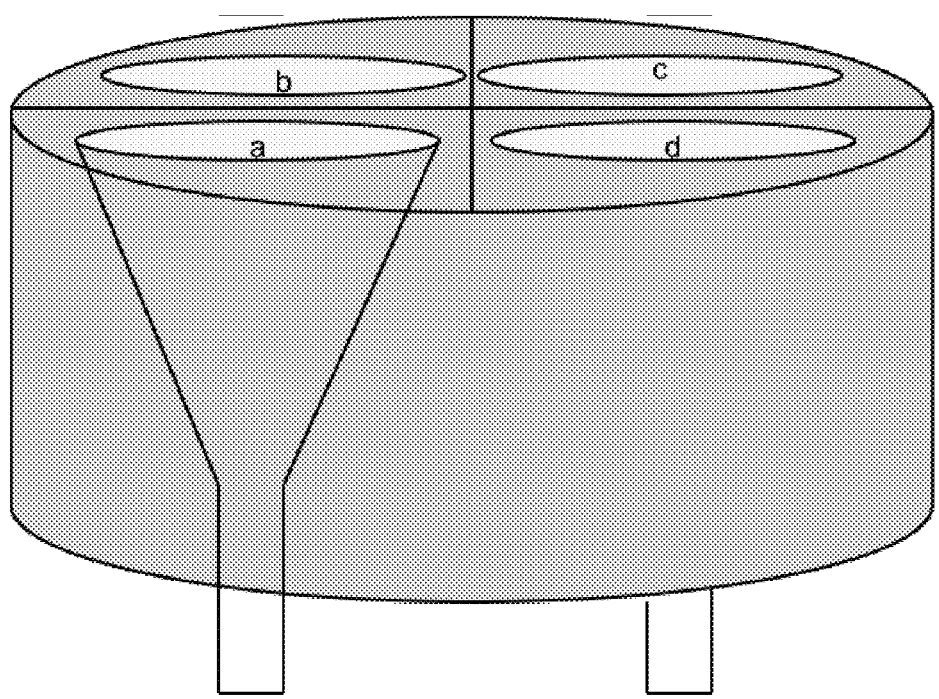
FIG. 5 shows the basic design of the surface plate and it's interior funnels facilitating water flow.
Figure 6:
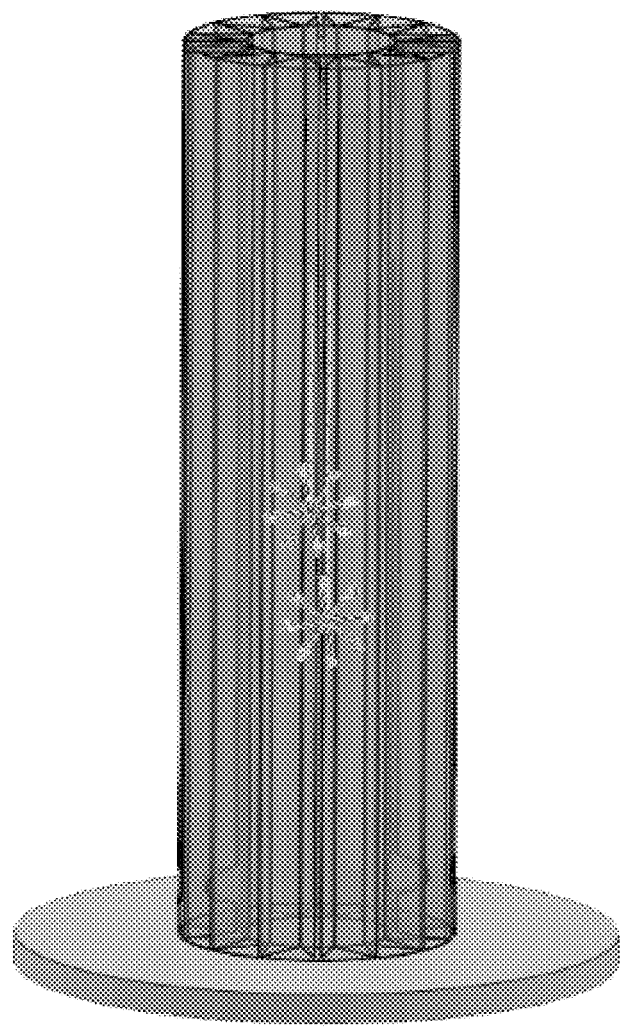
FIG. 6 shows the overall design of the system.

The surface plate, element (12) in FIG. 1, and shown from the top in FIG. 2, contains four funnel structures (one each in locations a, b, c, and d in FIG. 2) that facilitate the flow of the water over the top edge of the surface plate through the funnels down to the turbines in the inner tube. The basic design of the surface plate is shown in FIG. 5. A, b, c, and d are the funnel structures in the plate where the water from the outer tube flows through. Funnel a is drawn to show the interior view of the plate and the how the funnel is placed within it.

Outlet—The "6 ft Dia. Outlet" (7) is the outlet for the water that collects at the bottom of the inner tube. There are numerous embodiments for this element depending on where and how the system is being utilized, be it in water, at the water's surface, on a barge or near a pier, or on land.

When the system is in deep ocean water, the outlet will be utilized with a pump attached to facilitate the removal of the water in the inner tube. The pump will be attached at the lower portion of the system where the outlet is located, and will pump the water through the outlet which will continue on to a number of different end points. The movement of this water through the outlet will be facilitated through the use of a number of different types of pumps further described below. The number and type of pump or pumps to be used are determined by the energy needed to move the water through the outlet based on where the system is used (deep water, surface, land, etc), the pressure at the outlets opening and end point, and the distance it needs to be moved. In some embodiments the outlet will continue upward to above the water surface where the water flow back into the surround ocean. In other embodiments it will travel upward but stop under the water's surface to release the water into the surrounding body of water. This release point may range from just a few feet beneath the water's surface, to the bottom of the system where the outlet originates. The release points will have different energy needs to move the water a certain distance and, when releasing under the water's surface, overcome the pressure of the surrounding water at that depth. In the first instance, the force provided by the pump must be enough to move the water above the water level inside the inner tube and further upward to the water's surface using flow tubes attached to the outer surface tubes and from there extends above the water surface. In the last instance the force provided by the pump must be enough to overcome the water pressure of the surrounding ocean/body of water at that depth. A table of water pressure in the ocean at certain depths is included herein.

LAND OPERATION—When operating on land, the system calls for a closed system, such that water moving through the outlet valve at the bottom will be re-circulated into the outer tube so that it will re-enter the inner tube from the top as a renewed, re-circulated green energy. In this embodiment the energy required from the pump is that which is required to move the effluent water upward against gravity to reach the reentry point at the top of the outer tube. The means for collecting the water from the water source could involve a number of adaptations to the outer tube such that it need not flow directly from the source to the outer tube. These may include a pipe that taps into a dam or reservoir, a large basin structure or structures for collecting rain water, a large elevated water tank (must have adequate head) for collection and or storage, and many other adaptations that are standard in water collection, water storage and hydroelectric engineering.

Pumps

The type of pump can be alternated based upon how the system is being used, be it at depth in water, at the water's surface, on land or near a water surface consistent with that which is described herein. Examples of specific pumps useful with the current invention include but are not limited to actuator pumps, v pumps or suction pumps, mighty pumps, and ram pumps for example. The number, type, and possible combination of pumps is determined by the force needed to relocate effluent water over a distance, the pressure at the outlet pipe, and the amount of water entering the inner tube and therefore exiting through the outlet pipe. Traditionally powered pumps may also be used in alternative embodiments.

The pump may be powered by traditional sources of energy such as fuel combustion or electrical power from a source independent of the energy generated by the turbines in the overall system. In preferred embodiments, the energy to drive the pump will come from either the energy generated by the turbines in the inner tube, forces created or captured by the nature and design of the pump(s) itself, or a combination of both.

V Pump Example

Figure 7:
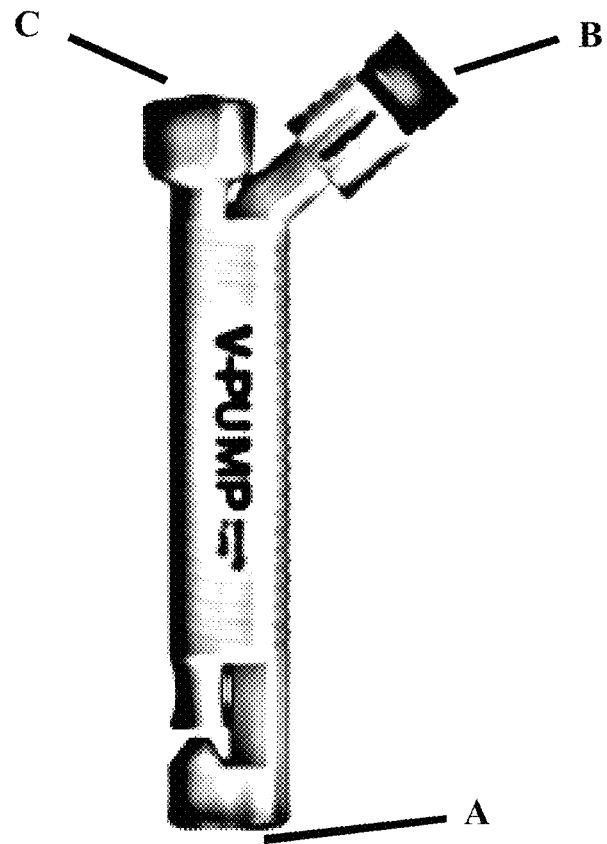
FIG. 7 shows a V-pump.

In one embodiment a pump design based upon a pump called a V-pump, which functions by using the entering water pressure (at point B) to create a suction force that that dispels water from other end of the tube, can be utilized to move the water from the bottom of the inner tube traveling through the outlet to a second location, consistent with that which is described above. For example, when used in an underwater environment such as a deep reservoir or in the ocean, the water and pressure entering point B shown above in FIG. 7, drive the suction process to force the water out at point C, after collecting it from end of the pump labeled area A above. The size and number of pumps will vary according to the water and distance that the water must travel through the outlet pipe. Additionally multiple pumps may be connected together such that a first pump connects at its effluent portion point C to a second pump at said second point pumps B and repeated as necessary to use the water pressure at depth to move the water via the cumulative suction forces to the desired exit point, for example at or above the water surface. The same can be done using a ram pump, siphon pump or pressure displacement preventative valve.

A ram pump or series of ram pumps may also be utilized. Ram pumps use the force of falling water to pump water above the height the falling water came from. Water falling a distance of 20 feet can be pumped 150 feet upward without any supplemental power. The distance between the turbines in the inner tube and the bottom of the inner tube will be utilized, in certain embodiments using ram pumps, to move the water upward to the waters surface or other desired exit points. Hydraulic ram pumps are well known in the art and the myriad of designs are readily adaptable to the current system.

When the system is located at depth but near the shoreline the outlet pipe may travel horizontally to exit the body of water and enter the land mass to release the effluent water underground.

The energy produced by the turbines can be stored on location or transmitted to other locations for use or storage. On site or off site units capable of storing electricity, cable transmitting lines, substations, and other methods of electrical grid storage and their applications within the system disclosed herein will be known to those skilled in the art.

What is claimed:

1. A hydroelectric system comprising:
   an outer tube having a top cover and a water inlet;
   an inner tube having an opening to allow water flow from the outer tube to the inner tube;
   a movable plate with solid sides and a porous top, said plate spanning the diameter of the inner tube and located within the inner tube to control the flow of water into the inner tube;
   hydroelectric turbines to capture the energy from falling water flowing into the inner tube; and
   an outlet for the incoming water.

2. The system of claim 1, further comprising one or more pumps chosen from actuator pumps, v pumps, suction pumps, mighty pumps, traditional power pumps, or ram pumps to facilitate water flow at the outlet to a next destination.

3. The system of claim 2 wherein the next destination is either the outer tube, a body of water outside the tubes, a surface of a body of water, or an adjacent body of land.

4. The system of claim 1, wherein the height of the tubes is between 25 and 2500 feet.

5. The system of claim 1, wherein the system is located on land and water is recirculated from the inner tube back to the outer tube.

6. The system of claim 1, wherein the system is submerged in a body of water.

7. The system of claim 1 further comprising hydro-screens to filter incoming water.

8. The system of claim 6 further comprising means for stabilizing a structure of the system.

9. The system of claim 1 further comprising means for storing or transmitting electrical energy produced by said hydroelectric turbines.

10. A hydroelectric system comprising:
    an outer tube approximately 45 feet in diameter having a top cover, a concrete base, and at least one water inlet;
    an inner tube approximately 25 feet in diameter having an opening to allow water to flow from the outer tube to the inner tube;
    a movable plate with solid sides and a porous top, said plate spanning the diameter of the inner tube and located within the inner tube to control the flow of water into the inner tube;
    hydroelectric turbines within the inner tube to capture falling water flowing into the inner tube;
    and an outlet for the water collecting in the inner tube.

11. The system of claim 10 further comprising means for storing or transmitting electrical energy produced by said hydroelectric turbines.

12. The system of claim 10 further comprising hydro-screens to filter incoming water.

13. The system of claim 10 further comprising means for stabilizing a structure of the system.

14. The system of claim 13 wherein the system is submerged in a body of water, and further comprising a collection pan beneath the turbines and opening to four pipes, said pipes between two and three feet in diameter with a length inside the inner tube of between fifty and one hundred feet, said pipes further connecting to a pump, the effluent of which is pumped above the surface of the ambient water.

15. The system of claim 14 further comprising means for storing or transmitting electrical energy produced by said hydroelectric turbines.

16. The system of claim 10 further comprising hydro-screens to filter incoming water.

* * * * *